(12) United States Patent
Scholz (10) Patent No.: US 11,108,059 B2
(45) Date of Patent: Aug. 31, 2021

(54) BIPOLAR PLATE HAVING A VARIABLE WIDTH OF THE REACTION GAS CHANNELS IN THE INLET REGION OF THE ACTIVE REGION, FUEL-CELL STACK AND FUEL-CELL SYSTEM HAVING BIPOLAR PLATES OF THIS TYPE, AS WELL AS A VEHICLE

(71) Applicants: VOLKSWAGEN AG, Wolfsburg (DE); AUDI AG, Ingolstadt (DE)

(72) Inventor: Hannes Scholz, Braunschweig (DE)

(73) Assignees: VOLKSWAGEN AG, Wolfsburg (DE); AUDI AG, Ingolstadt (DE)

(*) Notice: Subject to any disclaimer, the term of this patent is extended or adjusted under 35 U.S.C. 154(b) by 208 days.

(21) Appl. No.: 16/312,974

(22) PCT Filed: Jun. 20, 2017

(86) PCT No.: PCT/EP2017/065049
§ 371 (c)(1),
(2) Date: Dec. 21, 2018

(87) PCT Pub. No.: WO2017/220552
PCT Pub. Date: Dec. 28, 2017

(65) Prior Publication Data
US 2019/0229347 A1 Jul. 25, 2019

(30) Foreign Application Priority Data

Jun. 24, 2016 (DE) ...................... 10 2016 111 638.6

(51) Int. Cl.
*H01M 8/0265* (2016.01)
*H01M 8/0206* (2016.01)
(Continued)

(52) U.S. Cl.
CPC ....... *H01M 8/0265* (2013.01); *H01M 8/0206* (2013.01); *H01M 8/0213* (2013.01);
(Continued)

(58) Field of Classification Search
CPC .......... H01M 8/0265; H01M 8/04119; H01M 8/04134; H01M 8/0206; H01M 8/0213;
(Continued)

(56) References Cited

U.S. PATENT DOCUMENTS

| | | | |
|---|---|---|---|
| 2003/0077501 A1 | 4/2003 | Knights et al. | |
| 2006/0046132 A1* | 3/2006 | Goebel | H01M 8/24 429/434 |

(Continued)

FOREIGN PATENT DOCUMENTS

| | | |
|---|---|---|
| DE | 10 2008 033 211 A1 | 1/2010 |
| EP | 2 026 393 A1 | 2/2009 |

(Continued)

*Primary Examiner* — Gary D Harris
(74) *Attorney, Agent, or Firm* — Seed IP Law Group LLP (57) ABSTRACT

A bipolar plate for a fuel cell having two profiled separator plates with channels for reaction gases and coolant, wherein the channels for a reaction gas or both reaction gases have a smaller width in an inlet region of the active region than in the remaining sub-region of the active region, wherein the width thereof continuously increases from the beginning to the end of the inlet region. Supports between the channels have a greater width than in the remaining sub-region of the active region, wherein the sum of the width of the channels and the width of the supports is constant, and the width of the channels and the supports is constant in the entire remaining sub-region.

17 Claims, 5 Drawing Sheets

(51) Int. Cl.
    *H01M 8/0213* (2016.01)
    *H01M 8/0267* (2016.01)
    *H01M 8/04119* (2016.01)
    *H01M 8/1018* (2016.01)

(52) U.S. Cl.
    CPC ..... *H01M 8/0267* (2013.01); *H01M 8/04119* (2013.01); *H01M 8/04134* (2013.01); *H01M 2008/1095* (2013.01); *H01M 2250/20* (2013.01); *Y02T 90/40* (2013.01)

(58) Field of Classification Search
    CPC ....... H01M 8/0267; H01M 2008/1095; H01M 2250/20; Y02T 90/40; Y02E 60/50
    USPC .......................................................... 429/514
    See application file for complete search history.

(56) References Cited

U.S. PATENT DOCUMENTS

| | | |
|---|---|---|
| 2007/0224474 A1 | 9/2007 | Yang et al. |
| 2009/0047565 A1 | 2/2009 | Terasaki et al. |
| 2009/0197134 A1 | 8/2009 | Blank |
| 2011/0159396 A1* | 6/2011 | Kleemann ........... H01M 8/0265 |
| | | 429/457 |

FOREIGN PATENT DOCUMENTS

| | | |
|---|---|---|
| JP | 2004-79245 A | 3/2004 |
| WO | 2012/143781 A1 | 10/2012 |

\* cited by examiner

BIPOLAR PLATE HAVING A VARIABLE WIDTH OF THE REACTION GAS CHANNELS IN THE INLET REGION OF THE ACTIVE REGION, FUEL-CELL STACK AND FUEL-CELL SYSTEM HAVING BIPOLAR PLATES OF THIS TYPE, AS WELL AS A VEHICLE

The invention relates to a bipolar plate for a fuel-cell equipped with two, profiled, separator plates, each having an active region and two distribution regions for the intake and discharge of reaction gases and coolants into or out of the active region, wherein the separator plates are configured in such a way that the bipolar plate has separate channels for the reaction gases and the coolant which connect ports for reaction gases and coolants of the two distribution regions to each other and each of which are configured as open, gutter-type channel structures, wherein the two profiled separator plates are arranged one over the other in such a way that, in the sides adjoining one another, coolant channels are formed by the channel structures, a fuel-cell stack, a fuel-cell system, and a vehicle.

Fuel-cells use the chemical conversion of a fuel with oxygen into water in order to generate electrical energy. For this purpose, fuel-cells contain as a core component a so-called membrane electrode assembly (MEA), which is a combination of an ion-conductive—in particular, proton-conductive—membrane and an electrode (anode and cathode), respectively arranged on both sides of the membrane. Additionally, gas diffusion layers (GDL) may be arranged on both sides of the membrane electrode assembly on the sides of the electrodes facing away from the membrane. Usually, the fuel-cell is formed by a plurality of MEA's arranged in a stack, whose electrical power adds up. During operation of the fuel-cell, the fuel—in particular, hydrogen $H_2$ or a gas mixture containing hydrogen—is guided to the anode, where an electrochemical oxidation of $H_2$ to $H^+$ with loss of electrons takes place. A transport of the $H^+$ protons from the anode chamber into the cathode chamber is effected via the electrolytes or the membrane, which separates the reaction chambers from each other in a gas-tight and electrically-insulated manner (in a water-bound or water-free manner). The electrons provided at the anode are guided to the cathode via an electrical line. The cathode receives oxygen or a gas mixture containing oxygen, so that a reduction of $O_2$ to $O^{2-}$ with gain of electrons takes place. At the same time, those oxygen anions react in the cathode chamber with the protons transported via the membrane while forming water.

The fuel-cell is formed by a plurality of membrane electrode assemblies arranged in a stack, which is why this is also referred to as a fuel-cell stack. A bipolar plate is arranged between each two membrane electrode assemblies, ensuring that the individual cells receive the operating media, i.e., the reactants and a coolant. In addition, the bipolar plates ensure an electrically-conductive contact to the membrane electrode assemblies. Furthermore, they guarantee a sealed separation between the anode and cathode chambers.

In most cases, the bipolar plates are constructed of two, profiled, electrically-conductive separator plates that have a structure in the form of an elevation profile arranged on both sides of the plates. This profile results in more or less discrete channels on both sides of the plates, which are designed to guide the operating media. The operating media are in turn separated by the plates so that coolant is guided in the interior of the plate, while the reactant gases are guided outside. The channels of the reactant gases are bounded on the one hand by the respective plate and, on the other, by a gas diffusion layer.

For controlling the water supply with respect to the reaction gases in the bipolar plates so as to increase the power density, efficiency, and service life of the fuel-cell, it has been proposed in WO 2012/143781 A1 and US 20090197134 A1, inter alia, to incorporate a plurality of metal strips made of titanium in the channel for the reaction gas to be humidified—which, however, is expensive and complex to produce, because they are difficult to affix and position—or to incorporate a perforated metal plate in the channel, which is also expensive and complex to produce. In addition, these solutions cannot be used in combination with graphite bipolar plates.

Furthermore, a bipolar plate is known from DE 10 2008 033 211 A1 in which the width of the channels of a reaction gas and of the webs located in-between them is continuously varied.

The aim of the present invention is to provide a bipolar plate and a fuel-cell stack in which the gas composition and mass flows in the reaction gas channels are considered in relation to the length of the active region.

The invention relates to a bipolar plate for a fuel-cell, comprising two, profiled, separator plates, each having an active region and two distribution regions for feeding and discharging reaction gases and coolants to or from the active region, the separator plates being designed such that the bipolar plate has separate channels for the reaction gases and the coolant that connect ports for reaction gases and coolants of the two distribution regions to one another and are each configured as open, gutter-type channel structures. The two, profiled, separator plates are arranged one over the other in such a way that, in the sides adjoining one another, coolant channels are formed by the channel structures. The bipolar plate according to the invention is distinguished by the following configurations of the channel structures:

The channels for a reaction gas or both reaction gases have a smaller width in an intake region of the active region than in the remaining partial region of the active region, wherein the width of the channels continuously increases from the beginning to the end of the intake region.

Webs located between the channels have a greater width in the inlet region than in the remaining partial region of the active region.

The sum of the width of the channels and the width of the webs is constant.

The width of the channels and the width of the webs are constant in the entire remaining partial region.

, so that

The sum of channel width and web width represents a channel-web unit and is also referred to as "channel pitch."

By virtue of the design of a bipolar plate according to the invention, an increased humidification of the membrane occurs when said plate is used in a fuel-cell stack in the intake region of the reaction gas or gases, even, advantageously, when the intake moisture of the cathode gas is low.

In order to achieve this optimized humidification, the width of the reaction gas channels is reduced in the region of the gas intake in the active region, as it is provided in the other active region and, thus, the width of the webs between the reaction gas channels is increased, so that the reaction gases as well as the product water diffuse to a lesser degree through the GDL and, thus, a higher moisture differential between membrane and reaction gas channels ensues.

According to a preferred embodiment, the intake region occupies 5 to 30%—preferably, 10 to 25%—and, especially preferably 20%—of the active region, so that the membrane at the start of the active region is already sufficiently humidified, and, at the same time, too strong a humidification in the further course of the active region is avoided.

In order to be able to optimally tune the humidification to the particular fuel-cell system, the width of the channels or of the webs from the beginning to the end of the intake region can be designed to continuously or discontinuously increase.

By discontinuous is meant that the channel width in the intake region is less than in the remainder of the active region, but is constant, and that the channels widen only upon entry into the remaining area of the active region. To avoid turbulence of the reaction gas at this location, a shorter transfer region can be provided which avoids a step in the channel.

The design of a bipolar plate according to the invention can, advantageously, be implemented with metallic or graphitic bipolar plates.

The invention can preferably be used to control the humidification of the cathode gas, but it is also suitable for controlling the humidity of the anode gas. In the same way, both reaction gases can also be simultaneously affected, with regard to humidification, by a design according to the invention of the intake region of the bipolar plate.

Additional preferred embodiments of the invention arise from the remaining features mentioned in the dependent claims.

The various embodiments of the invention mentioned in this application may be combined advantageously with one another, unless stated otherwise in individual cases.

The design according to the invention of a bipolar plate, or of the anode and cathode plates of a bipolar plate, optimizes the pressure distribution, moisture distribution, and velocity distribution in the anode and cathode gas channels in the active region of the bipolar plate. Optimization in this context means that, as far as possible over the entire active region, uniform pressure conditions, consistent humidification of the reactants and the membrane, and identical flow speeds are present. In addition, the performance and service life of the fuel-cell stack are, advantageously, increased as a result.

The fuel-cell stack according to the invention comprises a stack of membrane electrode units and bipolar plates, designed as described above, arranged in an alternating manner.

A further aspect of the invention relates to a fuel-cell system having a fuel-cell stack according to the invention, as well as a vehicle that has at least one fuel-cell stack according to the invention. The vehicle is preferably an electric vehicle in which electrical energy generated by the fuel-cell system serves to supply an electric traction motor and/or a traction battery.

Figure 1:
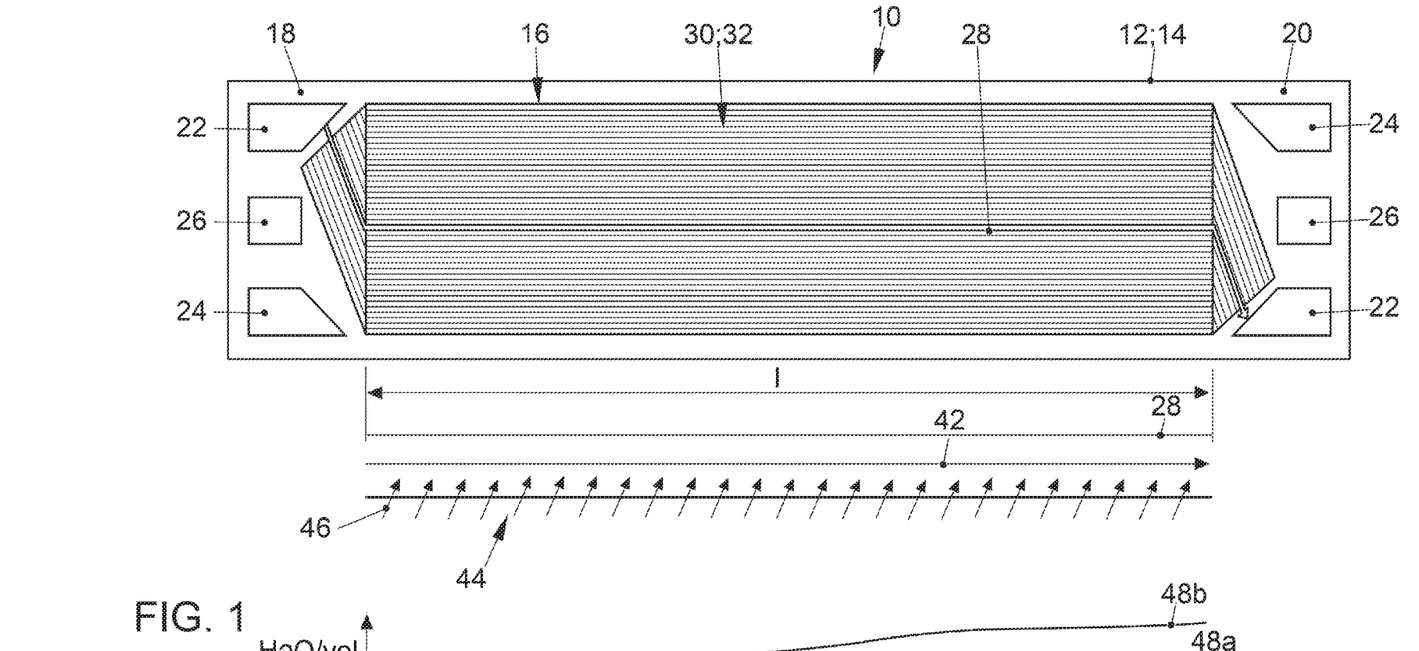
FIG. 1 in schematic views, the structure of a bipolar plate of the prior art, FIG. 2 in a diagram, the characteristics of the relative humidity of a membrane and in the reaction gas channel along the active region of the bipolar plate, compared to the minimum humidity of the membrane, FIG. 3 in a schematic view, the structure of a bipolar plate according to the invention, FIG. 4 in a diagram, a web/channel ratio of the bipolar plate according to FIG. 3 in relation to the active region, FIG. 5 in a diagram, the characteristics of the relative humidity of a membrane and in the reaction gas channel along the active region of the bipolar plate according to FIG. 3, compared to the minimum humidity of the membrane, FIG. 6 in a schematic cutaway view, the structure of a metallic bipolar plate according to the prior art or a bipolar plate according to the invention in the undivided region of the channel for a reaction gas, FIG. 7 in schematic cutaway views A-A and B-B of the bipolar plate according to FIG. 3, the structure of a metallic embodiment, FIG. 8 in a diagram, current-voltage characteristics for various channel geometries, FIG. 9 in a schematic view, the structure according to the invention of a bipolar plate according to a second embodiment, FIG. 10 in a diagram, a web/channel ratio of the bipolar plate according to FIG. 9, in relation to the active region, and FIG. 11 in a diagram, the characteristics of the relative humidity of a membrane and in the reaction gas channel along the active region of the bipolar plate according to FIG. 9, compared to the minimum humidity of the membrane.

The invention is explained below in exemplary embodiments with reference to the respective drawings. Shown are:

FIG. 1 shows a bipolar plate 10 according to the prior art.

The bipolar plate 10 has two, profiled, separator plates 12, 14, only one separator plate 12, 14 being visible in the plan view. The separator plates 12, 14 together form an active region 16, to which, on both sides, distribution regions 18, 20 are adjacent, each of which has two ports 22, 24 for reaction gases and one port 26 for a coolant, by means of which the reaction gases and the coolant are supplied to the active region 16 and discharged therefrom. Separate channels 28, 30, 32 for the reaction gases and the coolant run in the bipolar plate 10 and are open, gutter-like structures, of which only the channels 28 for a reaction gas, by a boldface line, are symbolized.

Moreover, FIG. 1 shows a longitudinal section through one of the channels 28 for a reaction gas, wherein the flow direction 42 is indicated by an arrow. From one side 44 of the channels 28, which side adjoins a gas diffusion layer if the bipolar plate 10 is arranged in a fuel-cell stack (not shown), product water 46 of the cell reaction (symbolized by arrows) enters into the channel so that the reaction gas is humidified.

Figure 2:
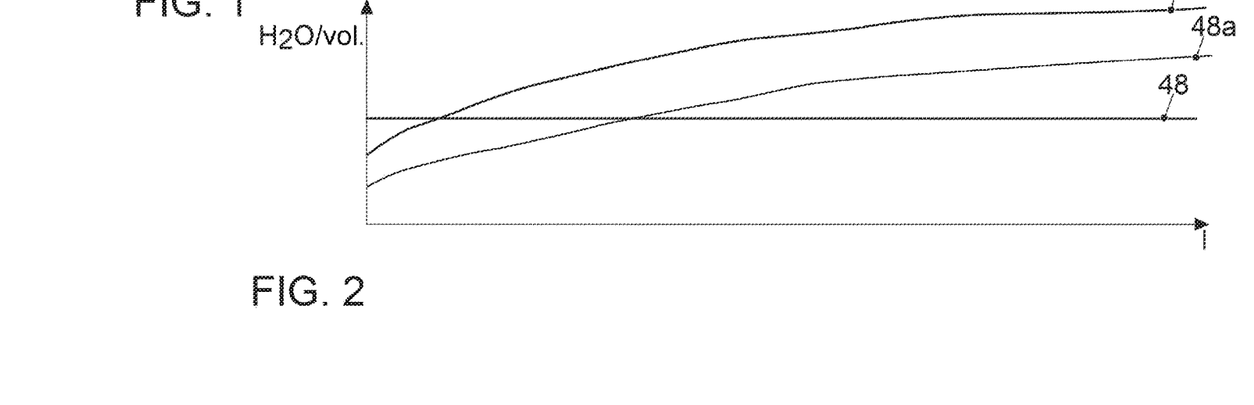

The proportion of water (curve 48*a*) in the reaction gas and the proportion of water (curve 48*b*) in the membrane of a fuel-cell are juxtaposed in a diagram in FIG. 2 of the admissible minimum humidification (curve 48) of the membrane in relation to the length I of the active region 16.

From this diagram, it is evident that, for fuel-cells having bipolar plates 10 according to the prior art, the reaction gas enters the active region 16 with too low a proportion of water, i.e., the water content is lower than the required minimum humidification of the membrane. Accordingly, the actual water content of the membrane at the start of the active region 16 is too low for an optimum conversion of the reaction gases. The reaction gas, as it flows through the active region 16, continuously absorbs product water 46, so that the water content of reaction gas and membrane rises above the required minimum humidification.

Figure 3:
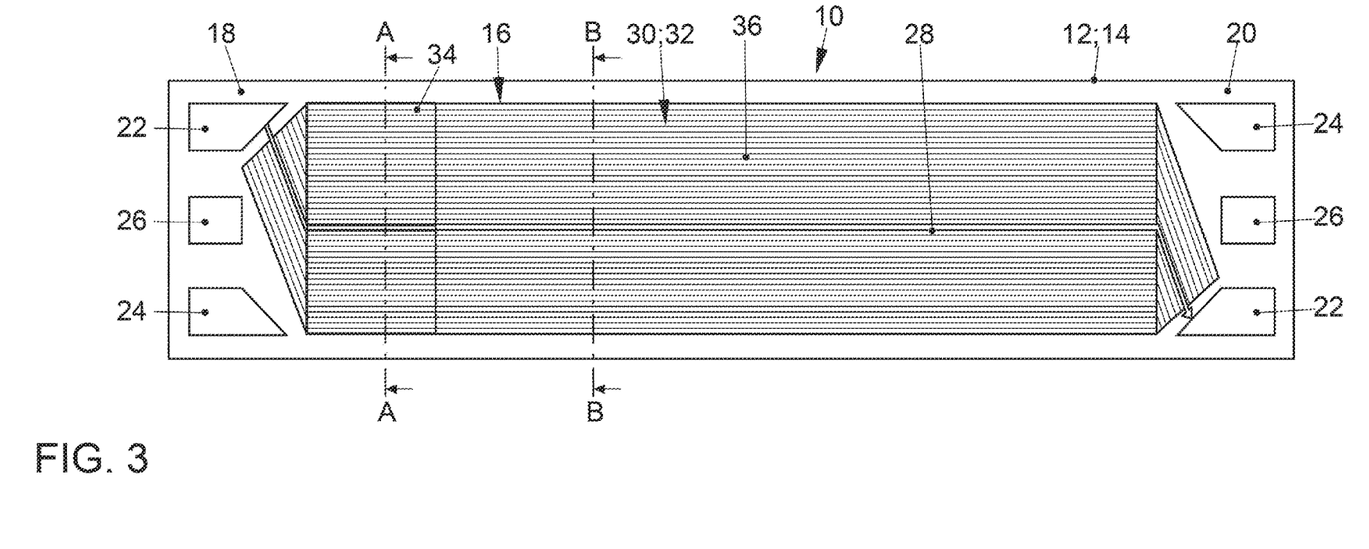

FIG. 3 shows a bipolar plate 10 designed according to the invention for a fuel-cell stack (not shown here) according to the invention. The structure of the bipolar plate 10 according to the invention corresponds to that of the bipolar plate 10 according to FIG. 1, with the difference, according to the invention, that the active region 16 is divided into an intake region 34, in which the reaction gas flows into the active region 16, and a remaining partial region 36. In the intake region 34, the channels 28 for a reaction gas have a smaller width B2 than in the partial region 36, while the webs 54 located between the channels 28 have a greater width B1. This is shown in detail in FIGS. 5 and 7.

The intake region 34 is optically delimited by a vertical line from the partial region 36, which otherwise has no technical significance. This applies likewise for the vertical line in FIG. 9.

Figure 4:
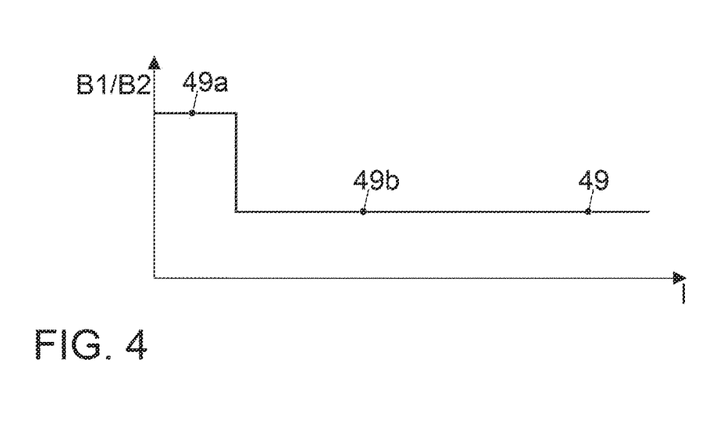

The ratio of the width B1 of the web 54 to the width B2 of the reaction gas channel 28 is represented in a curve 49 in the diagram according to FIG. 4. In the intake region 34, this ratio is, for example, 2:1 (reference number 49a), which, with entry into the remaining partial region 36 of the active region 16, drops to 1:1 (reference character 49b).

Figure 5:
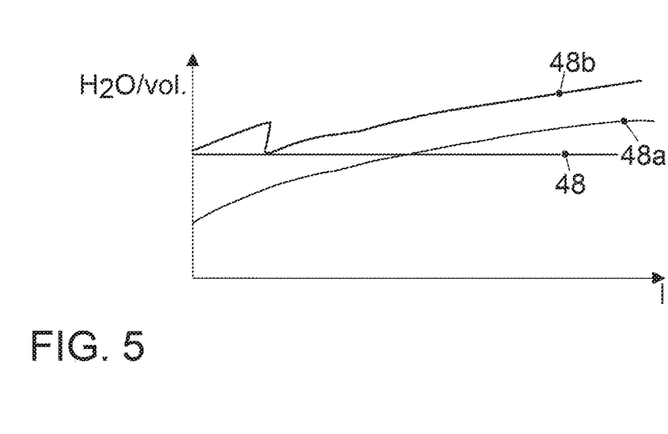

FIG. 5 shows, like FIG. 2, the course of the water proportion in the reaction gas (curve 48a) and in the membrane (curve 48b) of a fuel-cell in a diagram, as well as the allowed minimum humidity (curve 48) of the membrane in relation to the length I of the active region 16. In the intake region 34, a humidification of the membrane which exceeds the required minimum humidity, so that an optimum cell reaction can take place already in the intake region, is achieved by the design according to the invention. The humidification increases until the intake region 34 terminates and then drops abruptly down to the required minimum humidification. An extension of the intake region 34 would result in a further increase in the humidity, but it would negatively result in the passage of the reaction gas to or through the narrow channels 28 being hindered.

Figure 6:
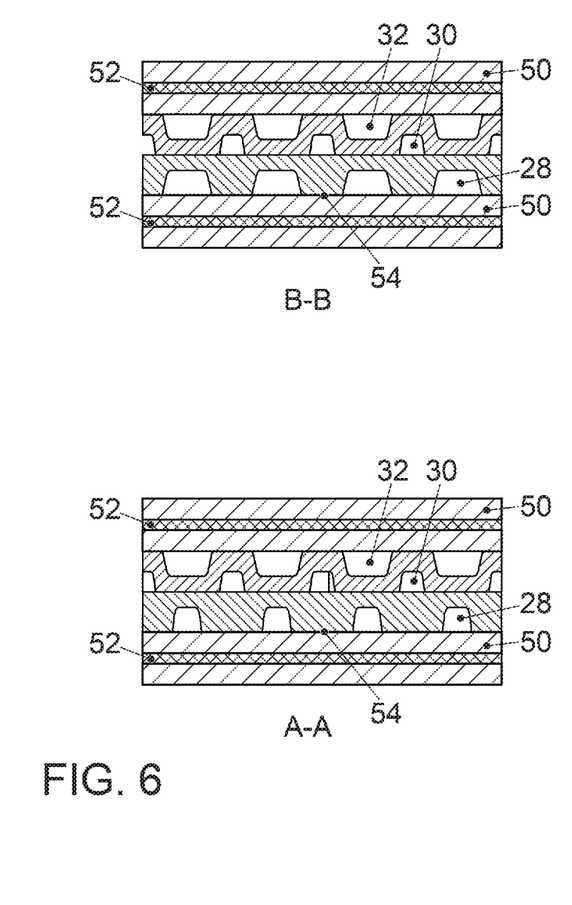
Figure 7:
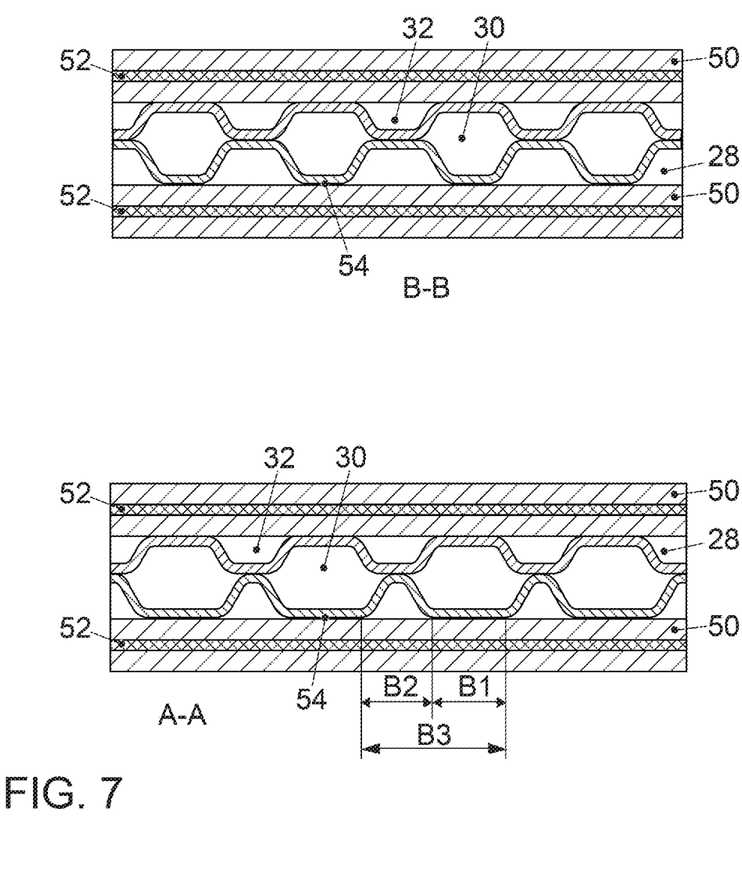

FIGS. 6 and 7 show a bipolar plate 10 according to FIG. 3 in sectional views A-A and B-B, wherein the sections A-A lie in the intake region 34, and the sections B-B lie in the remaining partial region 36 of the active region 16. In these views, the open, gutter-type reaction gas channels 28, 32 are adjacent to a GDL 50, in which a membrane 52 is located. Moreover, in FIG. 7, section A-A plots a width B1 for the web 54 formed by the channel 30 for the coolant, and a width B2 for the reaction gas channel 28, which together yield the width B3 for a channel-web unit.

Figure 8:
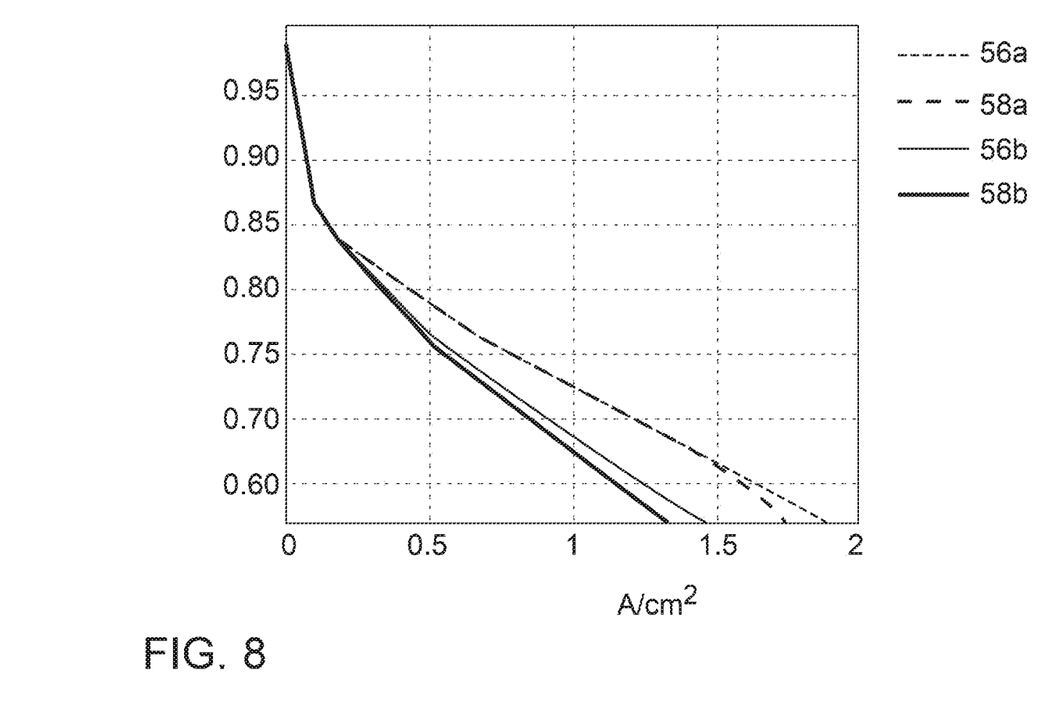

FIG. 8 shows simultaneous results of the local current-voltage characteristic under the assumption of different channel geometries, i.e., narrow, compared to the wide webs 54 or correspondingly narrow or wide channels 28, and with differently set relative humidities in the reaction gas channel 28 (60% vs. 100%). The curves show 100% relative humidity for wide webs 54 (56a), 100% for narrow webs 54 (58a), 60% for wide webs 54 (56b), and 60% for narrow webs 54 (58b). The results show that, although narrow webs 54 are advantageous in high humidity (dashed lines), wide webs 54 can result in higher performance at low humidity (solid lines). Therefore, the design of the active region 16 according to the invention with wide webs 54 in the intake region 34, and with wide webs 54 in the remaining partial region 36 of the active region 16, is advantageous.

Figure 9:
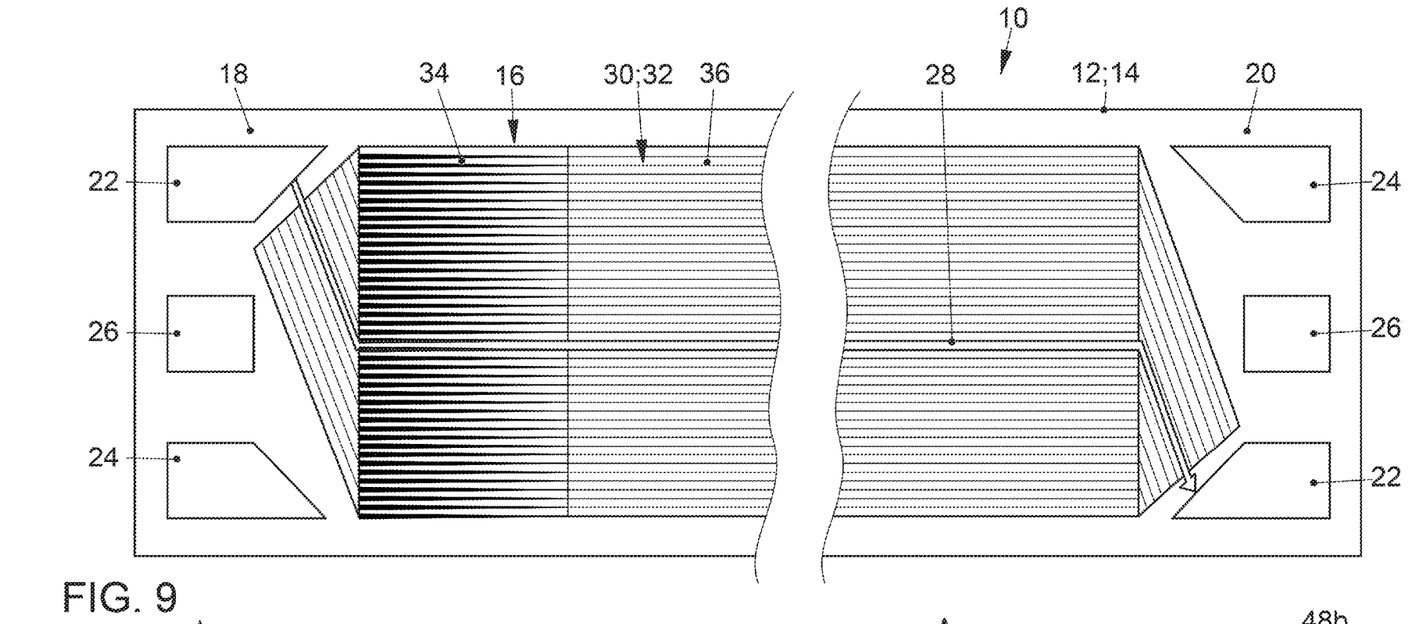

FIG. 9 shows a bipolar plate 10, configured according to the invention, according to a second embodiment. In contrast to the embodiment according to FIG. 3, the intake region 34 is designed in such a way that the width B2 of the channel 28 continuously increases from the beginning of the intake region 34 to the remaining partial region 36, and then retains its width B2.

Figure 10:
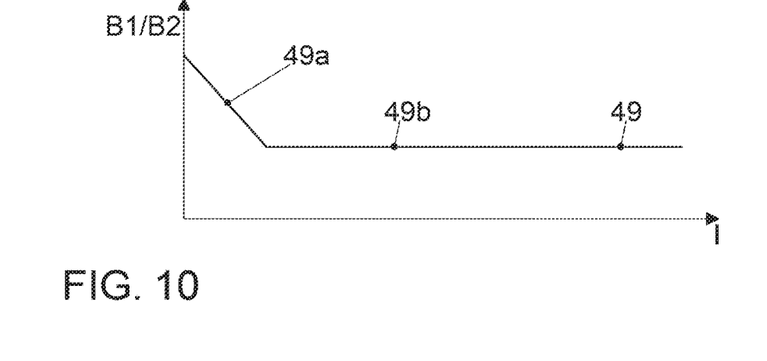

The ratio of the width B1 of the web 54 to the width B2 of the reaction gas channel 28 is represented in a curve 49 in the diagram according to FIG. 10. In the intake region 34, this ratio is, for example, 2:1, and drops continuously (reference character 49a), until entry into the remaining partial region 36 of the active region 16, to 1:1 (reference number 49b).

Figure 11:
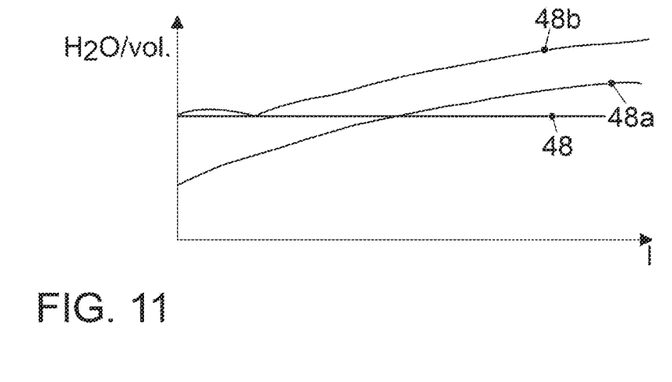

FIG. 11 shows the course of the water proportion in the reaction gas 48a and in the membrane 48b of a fuel-cell in a diagram, as well as the allowed minimum humidity of the membrane 48 in relation to the length I of the active region 16. In the intake region 34, a humidification of the membrane which exceeds the required minimum humidity, so that an optimum cell reaction can take place already in the intake region, is achieved by the design according to the invention. However, the humidity does not increase enough that the passage of the reaction gas through the narrow channels 28 would be hindered.

LIST OF REFERENCE SYMBOLS

10 Bipolar plate
12, 14 Separator plates
16 Active region
18, 20 Distribution regions
22, 24 Port for reaction gases
26 Port for coolant
28, 30, 32 Channels for operating media
34 Intake region
36 Partial region
42 Direction of flow
44 Side
46 Product water
48, 48a, 48b Curve
49 Channel-to-web ratio
49a, 49b Channel-to-web ratio in the intake region and in the partial region
50, 52 Region
54 Web
56a Curve wide webs 100%
58a Curve narrow webs 100%
56b Curve wide webs 60%
58b Curve narrow webs 60%
I Length
B1 Web width
B2 Channel width
B3 Channel width plus web width

The invention claimed is:
1. A bipolar plate for a fuel cell, comprising:
a first separator plate;
a second separator plate coupled to the first separator plate;
a plurality of reaction gas channels in each of the first and second separator plates; and
a plurality of coolant channels defined by the plurality of reaction gas channels in each of the first and second separator plates, wherein the first and second separator plates include an active region comprised of a first region and a second region, a first width of the plurality of reaction gas channels in the first region of each separator plate being less than a second width of the plurality of reaction gas channels in the second region of each separator plate, the first width continuously increasing across the first region, the second width constant across the second region, wherein a length of the first region comprises between 5 and 30% of a length of the active region.
2. The bipolar plate of claim 1 wherein the plurality of coolant channels include a first width in the first region that is greater than a second width in the second region.
3. The bipolar plate of claim 2 wherein a first sum of the first width of the plurality of reaction gas channels and the first width of the plurality of coolant channels is equal to a second sum of the second width of the plurality of reaction gas channels and the plurality of coolant channels across each separator plate.

4. The bipolar plate of claim 2 wherein the second width of the plurality of coolant channels continuously decreases across the first region.

5. The bipolar plate of claim 1 wherein the length of the first region is between 10 and 25% of the length of the active region.

6. The bipolar plate of claim 1 wherein the length of the first region is 20% of the length of the active region.

7. A system, comprising:
a first gas diffusion layer including a first membrane;
a second gas diffusion layer including a second membrane; and
a bipolar plate coupled between the first gas diffusion layer and the second gas diffusion layer, the bipolar plate including:
a separator plate including a plurality of reaction gas channels and a plurality of coolant gas channels, the separator plate further including an active region comprised of an intake region and a remaining region, wherein a first width of the plurality of reaction gas channels in the intake region is different than a second width of the plurality of reaction gas channels in the remaining region, the first width continuously changing across the intake region, the second width constant across the remaining region, wherein the intake region comprises between 5 and 30% of a length of the active region.

8. The system of claim 7 wherein the first width is less than the second width.

9. The system of claim 8 wherein the first width increases continuously across the intake region.

10. The system of claim 7 wherein the first width is greater than the second width.

11. The system of claim 10 wherein the first width decreases continuously across the intake region.

12. The system of claim 7 wherein the plurality of coolant channels include a first width in the intake region and a second, different width in the remaining region.

13. The system of claim 12 wherein the first width of the plurality of coolant channels is greater than the second width of the plurality of coolant channels.

14. A method comprising:
providing reaction gases to a gas diffusion layer through a plurality of reaction gas channels in a bipolar plate having an active region including an intake region in fluid communication with a remaining region, a width of the plurality of reaction gas channels in the intake region being less than a width of the plurality of reaction gas channels in the remaining region, wherein the width of the plurality of reaction gas channels in the intake region continuously increases across the active region, the width of the plurality of reaction gas channels is constant across the remaining region, and the active region comprises between 5 and 30% of a total length of the active region;
hydrating the gas diffusion layer with coolant passing through a plurality of coolant channels in the bipolar plate; and
maintaining humidity of a membrane in the gas diffusion layer above an allowed minimum humidity for a reaction in the active region.

15. The method of claim 14 wherein maintaining humidity of the membrane further includes decreasing the humidity of the membrane at a termination of the intake region.

16. The method of claim 15 wherein maintaining humidity of the membrane includes increasing humidity of the reaction gas from the intake region to the remaining region, the humidity of the reaction gas maintaining humidity of the membrane above the allowed minimum humidity after the termination of the intake region.

17. The method of claim 14 wherein hydrating the gas diffusion layer with coolant includes a width of the plurality of coolant channels in the intake region being greater than a width of the plurality of coolant channels in the remaining region.

* * * * *